United States Patent
Grupa

Patent Number: 5,845,912
Date of Patent: Dec. 8, 1998

[54] ADJUSTABLE QUICK CHANGE JAW APPARATUS

[76] Inventor: Robert J. Grupa, 34 S. Dreamweaver Cir., The Woodlands, Tex. 77380

[21] Appl. No.: 852,637

[22] Filed: May 7, 1997

Related U.S. Application Data

[60] Provisional application No. 60/016,791 May 17, 1996.
[51] Int. Cl.$^6$ ...................................................... B23B 31/16
[52] U.S. Cl. ........................... 279/124; 279/111; 279/153
[58] Field of Search ................................... 279/110, 111, 279/112, 123, 124, 152–154

[56] References Cited

U.S. PATENT DOCUMENTS

| | | | |
|---|---|---|---|
| 1,253,224 | 1/1918 | Fisher | 279/112 |
| 1,263,058 | 4/1918 | Griffith | 279/112 |
| 1,503,804 | 8/1924 | Phillips | 279/112 |
| 4,200,300 | 4/1980 | Rohm | 279/124 |
| 4,946,176 | 8/1990 | Hillenburg | 279/111 |
| 5,199,725 | 4/1993 | Jaggers | 279/123 |

*Primary Examiner*—Steven C. Bishop
*Attorney, Agent, or Firm*—Kenneth A. Roddy

[57] ABSTRACT

An adjustable quick change chuck jaw apparatus for attachment to a master jaw in the front face of a rotary chuck allows a machinist to quickly change the chuck jaws from one diameter to another. A generally rectangular jaw body is connected to the master jaw of a rotary chuck and extends radially outward from the central rotational axis of the chuck. A jaw member is slidably mounted on one side of the jaw body to travel longitudinally relative thereto and has a workpiece gripping portion extending perpendicularly outward. A rotatable shaft mounted in the jaw body has a threaded segment configured to become engaged with mating threads on the jaw member when rotated to an engaged position and to become disengaged therefrom when rotated to a disengaged position. A spring biased locking pin in the jaw body allows selective engagement with the shaft to prevent rotation thereof in a locked position and to become disengaged therefrom to allow rotation in an unlocked position. Upon depressing the locking pin, the shaft may be rotated to its disengaged position wherein the jaw member may be manually removed from the jaw body or moved thereon relative to the workpiece and accurately adjusted to grip the workpiece. Upon releasing the locking pin, the shaft is prevented from rotating and the jaw member is maintained in the adjusted position.

7 Claims, 4 Drawing Sheets

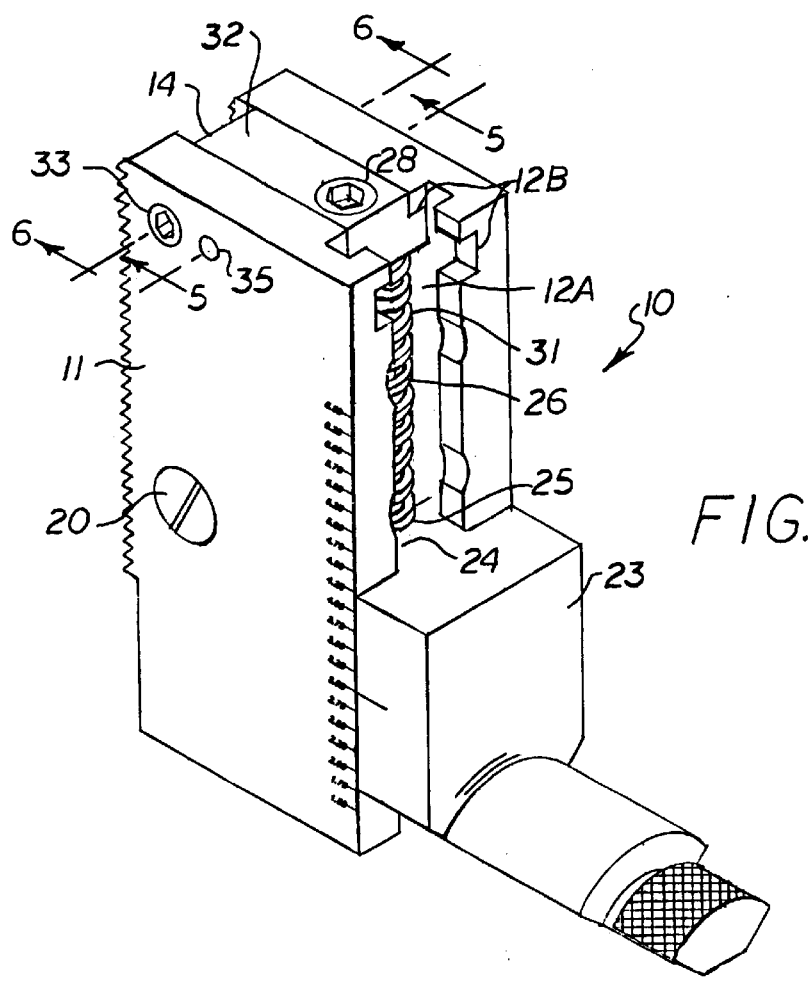
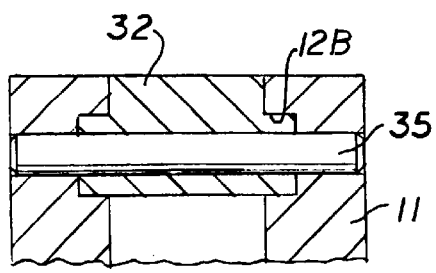
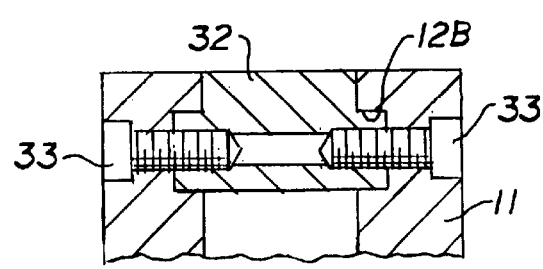

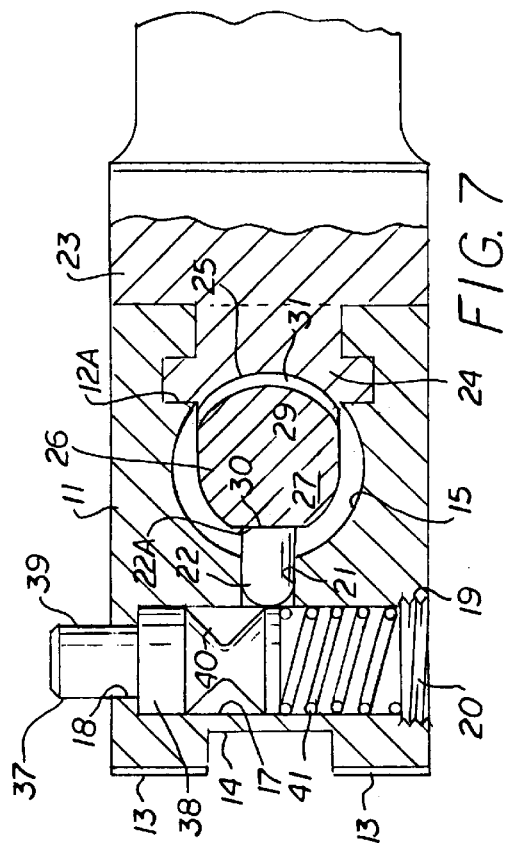
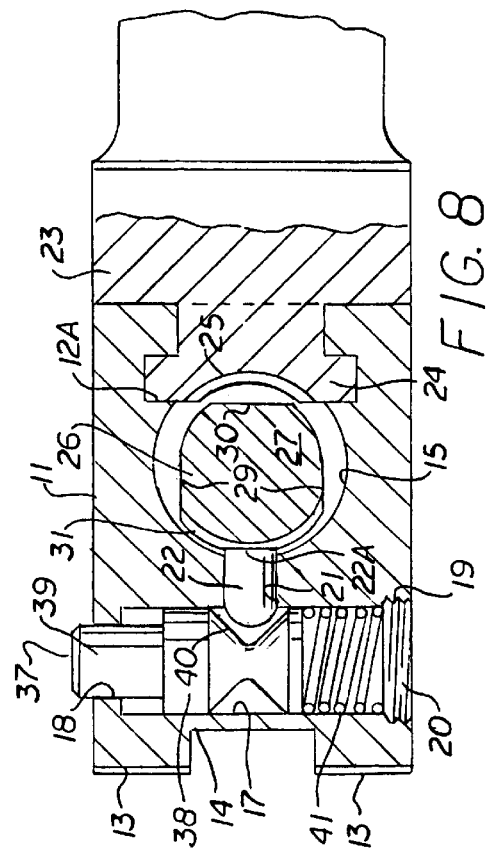
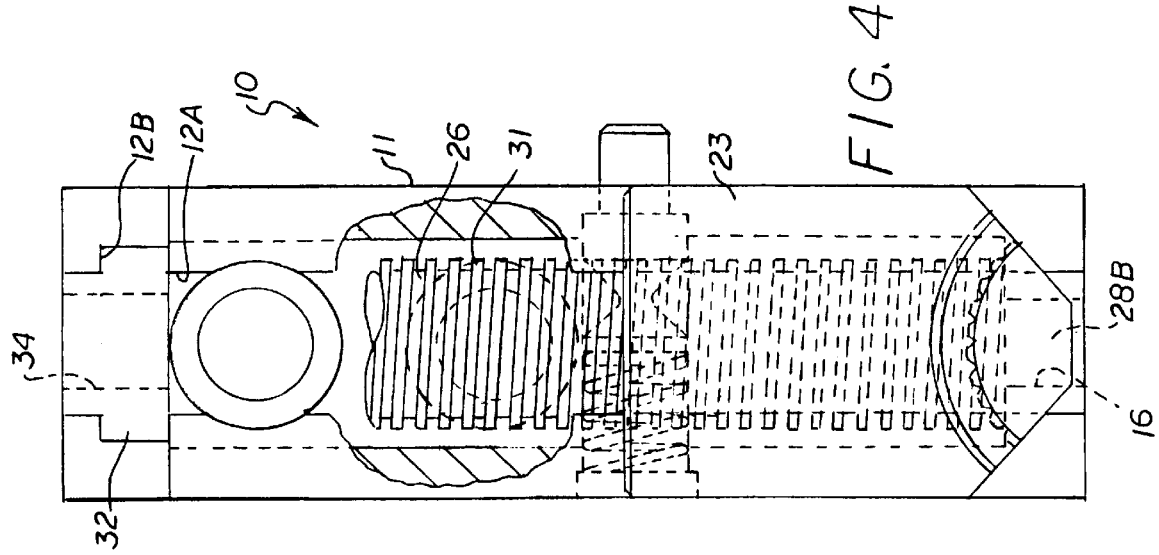

ADJUSTABLE QUICK CHANGE JAW APPARATUS

This application claims priority of Provisional Application Serial No. 60/016,791, filed May 7, 1996.

BACKGROUND OF THE INVENTION

1. Field of the Invention

This invention relates generally to chuck jaws for lathes, mills and drill presses, and more particularly to an adjustable chuck jaw apparatus which allows a machinist to quickly change the chuck jaws from one diameter to another.

2. Brief Description of the Prior Art

Conventional rotary chucks have radially movable master jaws in a front face that carry removable jaws that grip the workpiece. The workpiece gripping jaw utilizes a base having an insert attached which directly grips the workpiece. The inserts are provided in different sizes and different gripping faces that are useable with a single base to accommodate various sizes and types of workpiece surfaces. It often takes twenty to thirty minutes to change and adjust the conventional chucking apparatus from one diameter to another.

There are several patents which disclose various chuck jaw apparatus for reducing the time required to adapt the gripping jaw to accomodate different sizes of workpieces and to change the jaw insert.

Slater, U.S. Pat. No. 4,861,048 discloses a jaw assembly which attaches to the master jaw of a chuck and has detachable and repositionable hexagonal or polygonal clamping members secured to the leading edge of the jaw. The clamping members can be indexed by removing a securing screw, rotating the clamping member to the desired position, and resecuring the screw.

Lenz, U.S. Pat. No. 5,460,389 discloses a cylindrical jaw apparatus which attaches to a chuck and has detachable and repositionable cylindrical clamping members secured to a slide bar mounted in the chuck. The cylindrical clamping members have work receiving surfaces which can be positioned relative to the workpiece by removing the securing screws, rotating the clamping member to the desired position, and resecuring the screws.

Roberts et al, U.S. Pat. No. 5,529,320 discloses a jaw assembly having a top jaw which attaches to the master jaw of a chuck. The top jaw has a base with a lock pin that allows jaw inserts to be quickly removed and replaced.

The present invention is distinguished over the prior art in general, and these patents in particular by an adjustable quick change chuck jaw apparatus which attaches to a master jaw in the front face of a rotary chuck and allows a machinist to quickly change the chuck jaws from one diameter to another. A generally rectangular jaw body is connected to the master jaw of a rotary chuck and extends radially outward from the central rotational axis of the chuck. A jaw member is slidably mounted on one side of the jaw body to travel longitudinally relative thereto and has a workpiece gripping portion extending perpendicularly outward. A rotatable shaft mounted in the jaw body has a threaded segment configured to become engaged with mating threads on the jaw member when rotated to an engaged position and to become disengaged therefrom when rotated to a disengaged position. A spring biased locking pin in the jaw body allows selective engagement with the shaft to prevent rotation thereof in a locked position and to become disengaged therefrom to allow rotation in an unlocked position. Upon depressing the locking pin, the shaft may be rotated to its disengaged position wherein the jaw member may be manually removed from the jaw body or moved thereon relative to the workpiece and accurately adjusted to grip the workpiece. Upon releasing the locking pin, the shaft is prevented from rotating and the jaw member is maintained in the adjusted position.

SUMMARY OF THE INVENTION

It is therefore an object of the present invention to provide an adjustable quick change chuck jaw apparatus which attaches to a master jaw in the front face of a rotary chuck and allows a machinist to quickly and easily change the chuck jaws from one diameter to another.

It is another object of this invention to provide an adjustable quick change chuck jaw apparatus which does not require a time consuming procedure to position and adjust the gripping jaws relative to the workpiece.

Another object of this invention is to provide an adjustable quick change chuck jaw apparatus which allows the gripping jaws to be quickly and easily positioned and adjusted relative to the workpiece by depressing a locking pin and sliding them manually relative to the workpiece.

A further object of this invention is to provide an adjustable quick change chuck jaw apparatus which allows the gripping jaws to be quickly removed and replaced by depressing a locking pin and sliding them off or on a jaw body.

A still further object of this invention is to provide an adjustable quick change chuck jaw apparatus which is simple in construction, inexpensive to manufacture, and rugged and rele in operation.

Other objects of the invention will become apparent from time to time throughout the specification and claims as hereinafter related.

The above noted objects and other objects of the invention are accomplished by an adjustable quick change chuck jaw apparatus which attaches to a master jaw in the front face of a rotary chuck and allows a machinist to quickly change the chuck jaws from one diameter to another. A generally rectangular jaw body is connected to the master jaw of a rotary chuck and extends radially outward from the central rotational axis of the chuck. A jaw member is slidably mounted on one side of the jaw body to travel longitudinally relative thereto and has a workpiece gripping portion extending perpendicularly outward. A rotatable shaft mounted in the jaw body has a threaded segment configured to become engaged with mating threads on the jaw member when rotated to an engaged position and to become disengaged therefrom when rotated to a disengaged position. A spring biased locking pin in the jaw body allows selective engagement with the shaft to prevent rotation thereof in a locked position and to become disengaged therefrom to allow rotation in an unlocked position. Upon depressing the locking pin, the shaft may be rotated to its disengaged position wherein the jaw member may be manually removed from the jaw body or moved thereon relative to the workpiece and accurately adjusted to grip the workpiece. Upon releasing the locking pin, the shaft is prevented from rotating and the jaw member is maintained in the adjusted position.

BRIEF DESCRIPTION OF THE DRAWINGS

FIG. 1 is a perspective view of the adjustable quick change jaw apparatus in accordance with the present invention.

FIG. 4 is an end view of the adjustable quick change jaw apparatus.

FIG. 5 is a transverse cross section taken along line 5—5 of FIG. 1 showing the alignment dowel pin extending through the T-shaped retainer plate.

FIG. 6 is a transverse cross section taken along line 6—6 of FIG. 1 showing the cap screws securing the T-shaped retainer plate to the jaw body.

FIG. 7 is a cross sectional view of the adjustable quick change jaw apparatus taken along line 7—7 of FIG. 3, showing the actuator shaft in the locked position.

FIG. 8 is a cross sectional view of the adjustable quick change jaw apparatus showing the actuator shaft in the disengaged position.

DESCRIPTION OF THE PREFERRED EMBODIMENT

Figure 2:
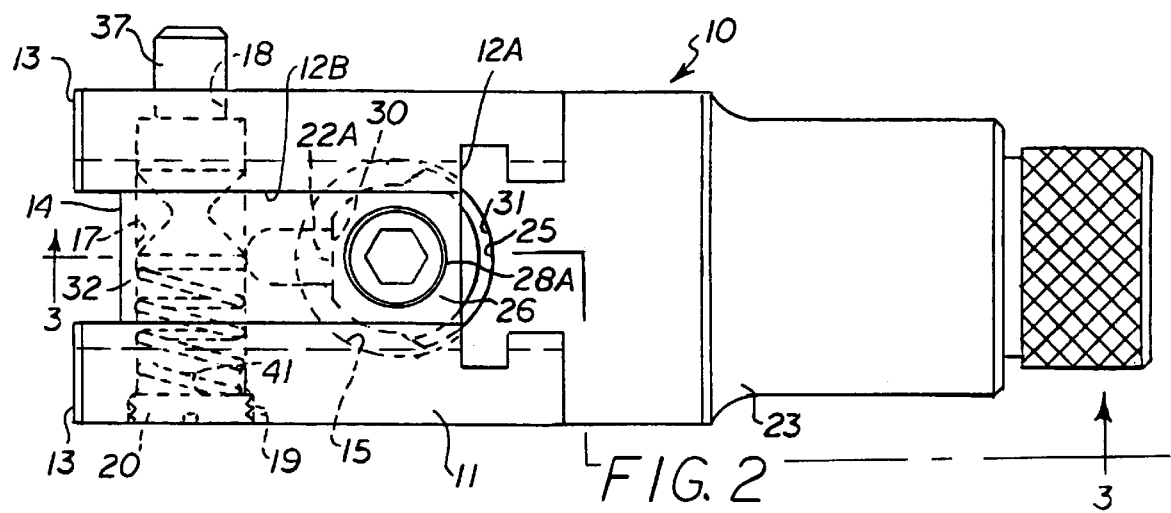
FIG. 2 is a top plan view of the adjustable quick change jaw apparatus.
Figure 3:
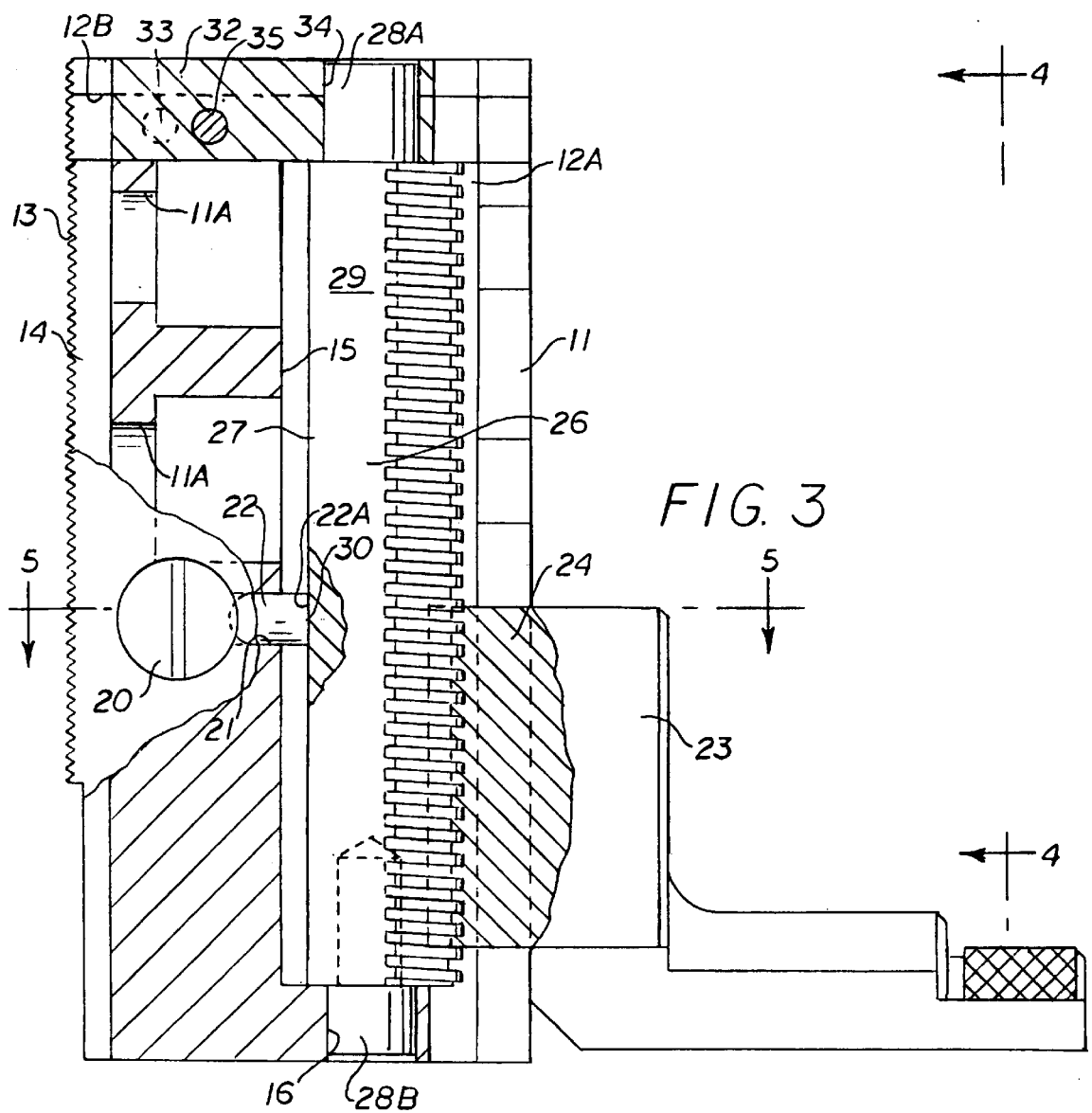
FIG. 3 is a cross sectional view of the adjustable quick change jaw apparatus taken along line 3—3 of FIG. 2.

Referring to the drawings by numerals of reference, there is shown in FIGS. 1–8, a preferred quick change adjustable chuck jaw assembly 10 in accordance with the present invention. Only one jaw assembly is shown, however is should be understood that the present jaw assemblies are provided in sets of three or four. A generally rectangular jaw body 11 is secured to the master jaw of conventional three or four jaw rotary chuck (not shown) in the same manner as a conventional chuck jaw, usually with two hex socket head cap screws (not shown) which pass through holes 11A in the back wall of the body 11. The jaw body 11 extends radially outward from the central rotational axis of the chuck.

The jaw body 11 has a vertical longitudinally extending T-slot 12A formed in one side extending the length of the body and a horizontal T-slot 12B formed in its top end. The opposite longitudinal side of the jaw body 11 is provided with a pair of laterally spaced longitudinally extending transversely serrated or toothed surfaces 13 separated by a central rectangular slot 14 extending the length of the body. The slot 14 and parallel spaced ridges of the toothed surfaces 13 correspond to the toothed surface of the master jaw.

A longitudinal bore 15 parallel and adjacent to the T-slot 12A extends inwardly through the jaw body 11 from one end and terminates in a reduced diameter bore 16 at the opposite end. A transverse bore 17 adjacent to the rectangular slot 14 extends through the jaw body 11 from one side and terminates in a reduced diameter bore 18 at the opposite side. The larger open end of the transverse bore 17 is provided with a threaded counterbore 19 which receives a retainer screw 20. A small bore 21 extends between the transverse bore 17 and the longitudinal bore 15. An oblong pin 22 having a rounded end and an opposed flat end 22A is slidably received in the small bore 21.

A generally L-shaped top jaw 23 having a T-shaped extension 24 extending the length of one side is slidably received in the T-slot 12A of the jaw body 11 to travel longitudinally therein. The outer surface of the T-shaped extension 24 has a recessed female threaded portion 25 forming an arcuate threaded segment which is disposed in one side of the longitudinal bore 15.

An elongate actuator shaft 26 having a generally cylindrical central portion 27 with a reduced diameter trunnion portion 28A at its top end and a modified cap screw 28B threadedly engaged in its bottom end is received in the longitudinal bore 15 of the jaw body 11. The headed portion of the cap screw 28B is modified to have a smooth exterior surface to serve as the lower trunnion for the actuator shaft 26. The central portion 27 of the actuator shaft 26 has a longitudinally extending arcuate threaded segment with male threads 31 which extend the length of the central portion. Two unthreaded flat surfaces 29 extend longitudinally along opposed sidesof the central portion 27 and a third flat surface 30 extends longitudinally along the length of the central portion opposite the arcuate threaded portion 31 to receive the flat end 22A of the oblong pin 22.

It should be understood that the oblong pin 22 may have opposed rounded ends and that the shaft 26 may be provided with a recessed detent opposite the arcuate threaded portion 31 to receive the rounded end of the oblong pin.

An inverted T-shaped retainer plate 32 is slidably received in the horizontal T-slot 12B. The retainer plate 32 has a bore 34 extending therethrough axial alignment with the longitudinal bore 15. As best seen in FIGS. 5 and 6, a dowel pin 35 extends transversely through the jaw body 11 and the retainer plate 32 to facilitate proper aligment of the bores 34 and 15, and the retainer plate 32 is secured in the top end of the of the jaw body 11 by hex socket head cap screws 33 to retain the actuator shaft 26 in the jaw body. The T-shaped retainer plate 32 extends horizontally between the vertical T-slot 12A and rectangular slot 14 in the jaw body.

The reduced diameter trunnion portion 28A of the actuator shaft 26 is rotatably received in the bore 34 of the retainer plate 32, and the modified cap screw 28B is threadedly engaged in the bottom end of the actuator shaft 26 through the reduced bore 16 of the jaw body 11 with its smooth headed portion rotatably disposed in the reduced bore 16 to serve as the lower trunnion. Thus, the actuator shaft 26 is rotatably mounted in the jaw body 11. The trunnion 28A is provided with a hex socket which receives a tool, such as an allen wrench, for rotating the actuator shaft 26. When the actuator shaft is rotated, its male threaded portion 31 will become engaged with, and disengaged engaged from, the female threaded portion 25 in the T-shaped extension 24 of the top jaw 23.

A locking pin 37 is slidably received in the transverse bore 17 of the jaw body 11. The locking pin 37 has a cylindrical central portion 38 and a reduced diameter portion 39 which which extends a distance outwardly through the reduced diameter bore 18 in the jaw body 11. The central portion 38 of the locking pin 37 has a circumferential V-groove 40 which, depending upon its position, receives the rounded end of the oblong pin 22 opposite the flat end 22A which is received on the flat surface 30 of the actuator shaft 26. A compression spring 41 received in the transverse bore 17 has one end engaged on the retainer screw 20 and its opposite end engaged on the inward end of the locking pin 37.

As shown in FIG. 7, the compression spring 41 normally urges the locking pin 37 to an outwardly extended position relative to the jaw body 11. In this outwardly extended position, hereinafter referred to as the "locked position", the V-groove 40 of the locking pin 37 is out of alignment with the end of the oblong pin 22. In the "locked position", the flat end 22A of the oblong pin 22 is forced by the cylindrical surface of the locking pin 37 onto the flat surface 30 on the actuator shaft 26 to prevent rotation of the shaft. Also in the "locked position", the male threaded portion 31 of the actuator shaft 26 is threadedly engaged with the female threaded portion 25 in the T-shaped extension of the top jaw 23.

As shown in FIG. 8, when the outer end 39 of the locking pin 37 is depressed inwardly against the force of the compression spring 41, the V-groove 40 becomes aligned with the oblong pin 22 and the actuator shaft 26 can then be rotated freely. When the actuator shaft 26 is rotated, its larger radius male threaded portion 31 will become threadedly disengaged from the female threads 25 of the top jaw 23 and will force the rounded end of the oblong pin 22 into the V-groove 40 of the locking pin 37. This position is hereinafter referred to as the "disengaged position".

Thus, the actuator shaft 26 can be rotated only after depressing the actuator locking pin 37 into a position that allows the oblong pin 22 to be aligned with the V-shaped groove 40 of the locking pin 37. In a preferred embodiment, the locking pin 37 requires a force of from about 20 to 30 foot pounds of pressure to position its V-groove 40 to allow the oblong pin 22 to disengage from the actuator shaft 26.

OPERATION

When the locking pin 37 is depressed and the actuator shaft 26 is rotated 180° from the "locked position" to the "disengaged position" (FIG. 8), its flat surface 30 becomes positioned adjacent to the female threaded portion 25 in the T-shaped extension 24 of the top jaw 23 with clearance therebetween. In this position, the top jaw 23 is threadedly disengaged from the actuator shaft 26. The top jaw 23 can then be manually moved in the T-slot 12A along the length of the jaw body 11 and adjustably positioned radially with respect to the workpiece or removed from the jaw body. The actuator shaft 26 may also be rotated with the locking pin depressed to accurately adjust the top jaw relative to the workpiece by the pitch of the threads 31 on the actuator shaft.

The radial adjustment (or pitch) of the top jaw 23 is, and can be, variable, depending upon the particular application, the amount of the increment of the radial adjustment desired of the top jaw 23 and the amount of radial stroke of the chuck in which the jaw assemblies are installed.

When the top jaw 23 is repositioned, adjusted for position relative to the workpiece, or replaced with another top jaw, the actuator shaft 26 and the shaft has been rotated 180° and is then in the "locked position" (FIG. 7) with the male threads 31 of the actuator shaft engaged with the female threads 25 of the top jaw 23 and the locking pin 37 is released. The compression spring 41 urges the locking pin 37 outwardly and its cylindrical surface forces the flat surface 22A of the oblong pin 22 into engagement on the flat surface 30 of the actuator shaft 26. This prevents rotation of the shaft 26 and maintains the top jaw 23 in the adjusted position along the length of the jaw body 11 with respect to the workpiece by the threaded engagement.

The top jaw 23 which has been illustrated as an example is designed to engage the inside of a workpiece. However, it should be understood that the top jaw 23 may also be designed to accomodate the chucking of workpieces on the outside, and that they may be configured to accept soft inserts that can be bored or turned for special applications of chucking. These inserts can be held in place by any conventional fastener means, such as a hex socket head cap screw. The top jaws 23 may also be provided with teeth serrations for chucking objects that have been hardened for resistance to wear.

In a preferred embodiment, each top jaw 23 is engraved with a diameter set mark showing the actual smallest and largest diameter that the top jaw set will hold. The jaw body 11 is also engraved with this same diameter relative to the radial position of the top jaw 23, jaw body 11, and the centerline of the chuck that it is mounted on. The jaw body 11 is also engraved with the range of diameters that each set of top jaws will position to as seen in FIG. 1.

Each set of top jaws will position to a range of several inches in diameter. Each top jaw set is engraved to show the smallest diameter position that the particular set will hold. The jaw body 11 is engraved to show the range of diameters for each set of top jaws. The diameter set marks are used to set the radial position of the top jaw 23 on the jaw body 11 in relation to the diameter of the object being chucked. The object can be measured in relation to diameter, then the top jaws set in a radial position relative to this diameter. Usually no further adjustments are necessary before completing the chucking.

Thus, it can be seen from the foregoing, that the present adjustable quick change jaw assembly reduces the time required to change, adjust, disassemble and reassemble chuck jaws on a chuck, and allows top jaws to be quickly adjusted or changed in just several minutes.

While this invention has been described fully and completely with special emphasis upon a preferred embodiment, it should be understood that within the scope of the appended claims the invention may be practiced otherwise than as specifically described herein.

I claim:

1. An adjustable chuck jaw apparatus for attachment to a master jaw in the front face of a rotary chuck for allowing a machinist to quickly change the chuck jaws from one diameter to another, comprising:

a generally rectangular jaw body adapted to be connected to a master jaw in a front face of a rotary chuck to extend radially outward from a central rotational axis of the chuck;

a jaw member having a longitudinally extending arcuate threaded segment along one side and a gripping portion extending perpendicularly outward to grip a workpiece;

an elongate rotatable shaft mounted in said jaw body having an arcuate threaded segment on its outer periphery sized to become engaged with said arcuate threaded segment of said jaw member when rotated to an engaged position and to become disengaged therefrom when rotated to a disengaged position, and a recessed portion in its outer periphery in opposed relation to its said arcuate threaded segment;

spring biased locking pin means slidably mounted in said jaw body having a sliding element selectively engaging said shaft recessed portion to prevent rotation thereof in a locked position and to become disengaged therefrom to allow rotation thereof in an unlocked position, said locking pin means being normally spring biased to said locked position;

upon manually depressing said locking pin means and rotating said shaft said sliding element is free to slide relative to said shaft as it rotates to engage and disengage said arcuate threaded segment of said shaft with said arcuate threaded segment of said jaw member, and upon releasing said locking pin means, said sliding element engages said recessed portion when said threaded segments are engaged to prevent rotation of said shaft and maintain the engagement of said threaded segments; wherein when said locking pin means is moved to its said unlocked position, said jaw member is incrementally moved longitudinally along said jaw body with respect to the central rotational axis of the chuck by rotation of said shaft; and upon depressing said locking pin means said shaft may be rotated to said disengaged position and said jaw member may be manually removed from said jaw body or moved thereon relative to said workpiece and accurately adjusted to grip said workpiece, and upon releasing said locking pin means said sliding element engages said shaft recessed portion to prevent shaft rotation and said jaw member is maintained in said adjusted position.

2. The adjustable chuck jaw apparatus according to claim 1, wherein said locking pin means comprises a first pin member slidably mounted transversely in said jaw body, said first pin having a reduced diameter portion at one end that protrudes a distance outwardly from one side of said jaw body and a cylindrical central portion having a having a recessed circumferential V-groove;

a compression spring disposed between said first pin and said jaw body to normally urge said reduced diameter portion outwardly relative to said jaw body; and said second sliding element is a second pin member slidably mounted in said jaw body perpendicular to said first pin member and having first and second ends;

in the outwardly extended position, said second pin member first end is engaged on said first pin central cylindrical portion and its said second end is engaged on said shaft recessed portion to prevent rotataion of said shaft;

upon manually pressing said first pin reduced diameter toward said jaw body, said recessed V-groove becomes aligned with said second pin member first end allowing said shaft to be rotated, and upon rotation said arcuate threaded segment of said shaft engages said second end of said second pin and pushes said second pin first end into said recessed V-groove; and upon releasing said first pin reduced diameter, said compression spring urges said reduced diameter portion outwardly relative to said jaw body and said first pin cylindrical portion again becomes engaged with said second pin member first end with its said second end engaged on said shaft recessed portion to prevent rotataion of said shaft.

3. The adjustable chuck jaw apparatus according to claim 1, wherein said elongate shaft recessed portion is a flat surface extending longitudinally along the length of said shaft outer periphery in opposed relation to its said arcuate threaded segment.

4. The adjustable chuck jaw apparatus according to claim 1, wherein said jaw body has a vertical longitudinally extending T-slot formed in one side extending substantially the length of the said body; and said jaw member has a T-shaped extension extending the length of one side slidably received in said T-slot of the said jaw body to travel longitudinally therein; and said jaw member longitudinally extending arcuate threaded segment is formed in said T-shaped extension.

5. The adjustable chuck jaw apparatus according to claim 1, further comprising a tool receiving socket at one end of said elongate shaft to receive a tool for rotating said shaft.

6. The adjustable chuck jaw apparatus according to claim 1, further comprising a pair of laterally spaced transversely toothed surfaces separated by a central rectangular slot extending longitudinally along a side of said jaw body opposite the side to which said jaw member is mounted configured to engage corresponding surfaces of a master jaw.

7. The adjustable chuck jaw apparatus according to claim 1, further comprising at least one hole extending through a rear wall of said jaw body opposite the side to which said jaw member is mounted and through which a bolt may be installed for securing said jaw body to a master jaw.

* * * * *